US008630227B2

(12) United States Patent
Dimou

(10) Patent No.: US 8,630,227 B2
(45) Date of Patent: Jan. 14, 2014

(54) TRANSMISSION OF DATA PACKETS IN A WIRELESS COMMUNICATION NETWORK

(75) Inventor: Konstantinos Dimou, Stockholm (SE)

(73) Assignee: Panasonic Corporation, Osaka (JP)

( * ) Notice: Subject to any disclaimer, the term of this patent is extended or adjusted under 35 U.S.C. 154(b) by 1370 days.

(21) Appl. No.: 12/299,891

(22) PCT Filed: May 2, 2007

(86) PCT No.: PCT/EP2007/003873
§ 371 (c)(1),
(2), (4) Date: Jan. 13, 2009

(87) PCT Pub. No.: WO2007/128479
PCT Pub. Date: Nov. 15, 2007

(65) Prior Publication Data
US 2009/0207820 A1 Aug. 20, 2009

(30) Foreign Application Priority Data
May 8, 2006 (EP) .................................. 06009458

(51) Int. Cl.
H04W 4/00 (2009.01)
H04B 7/00 (2006.01)
H04W 24/00 (2009.01)

(52) U.S. Cl.
USPC ........................... 370/328; 455/516; 455/423

(58) Field of Classification Search
USPC .......................................................... 370/328
See application file for complete search history.

(56) References Cited

U.S. PATENT DOCUMENTS

| 2003/0054812 A1 | 3/2003 | Hunzinger |
| 2004/0185887 A1 | 9/2004 | Wolman |
| 2004/0246917 A1 | 12/2004 | Cheng |

FOREIGN PATENT DOCUMENTS

| EP | 05 027 218.6 | 6/2007 |
| EP | 06 006 872.3 | 10/2007 |

OTHER PUBLICATIONS

International Search Report dated Jul. 26, 2007.
A. Adya at al, "A Multi-Radio Unification Protocol for IEEE 802.11 Wireless Networks," Broadband Networks, 2004. First International Conference on San Jose, CA, USA Oct. 25-29, 2004, Piscataway, NJ, USA, IEEE, Oct. 25, 2004, pp. 344-354, XP010749110.
P Kyasanur et al, "Routing and interface assignment in multi-channel multi-interface wireless networks," Wireless Communications and Networking Conference, 2005 IEEE New Orleans, LA, USA March 13-17, 2005, Piscataway, NJ, USA, IEEE, Mar. 13, 2005, pp. 2051-2056, XP010791496.

*Primary Examiner* — Noel Beharry
(74) *Attorney, Agent, or Firm* — Dickinson Wright PLLC

(57) ABSTRACT

The invention relates to a method for retransmitting data packets in a network. Further, the invention relates to an adapted system for performing the method. To improve the robustness in the transmission of an acknowledgment message by a mobile terminal to the network, while minimizing a signaling overhead, the invention provides mechanisms that optimize the retransmission of data packets and manage acknowledgement messages. The mechanisms disclosed are particular applicable to heterogeneous radio access networks.

28 Claims, 7 Drawing Sheets

TRANSMISSION OF DATA PACKETS IN A WIRELESS COMMUNICATION NETWORK

TECHNICAL FIELD OF THE INVENTION

The invention relates to a method for transmitting data packets to a mobile terminal in a network and an adapted access point for performing the method.

BACKGROUND OF THE INVENTION

In the recent years, a variety of widely spread wireless communication networks has been developed. These networks use different access technologies and range from wireless personal area networks to satellite based networks, that are globally available. Between the above mentioned extremes, there is a variety of different networks and network technologies available that provide local, regional or country wide coverage, such as Bluetooth, Wireless-LAN using the IEEE 802.11 standard or cellular telecommunication networks such as GSM or UMTS.

Upon movement of a user, different network access technologies may be available to the user terminal. Small areas with a typical size of a building are often covered by networks using Bluetooth, DECT or Wireless-LAN (W-LAN) technologies. In a private environment the user e.g. favors using a headset or the like supporting Bluetooth technology or using the service provided by a W-LAN hotspot, that is typically available at airports, railway stations, internet cafes, etc.

In an urban environment the user terminal can be connected to a cellular network, whilst upon movement to a more rural area the service may be provided by a different network provider. So the network technology e.g. GSM or UMTS may remain unchanged but the access network and the service provider changes. Upon further location change, e.g. when the user crosses the borders of a country, the need for roaming between networks of different providers and even handovers between different network technologies very likely arises.

The user may move to areas where no network service is available except for satellite based network service. Also in this situation there may be the necessity to handoff the mobile terminal e.g. from a UMTS network to a satellite based network.

In addition, not only the handoff of mobile terminals between different access networks and different access technologies, also parallel communication with different networks, network technologies, or different access points may be of interest. Upon movement of a user to an airport or a railway station, it may be of interest to receive services e.g. an updated timetable via a local W-LAN hotspot service, while remaining connected to e.g. a voice service provided by UMTS.

In summary, nowadays a user terminal upon movement may utilize a variety of different wireless communication networks, network technologies and services that are available. It may be desirable to handoff the mobile terminal, to establish one or more connections and to keep the mobile terminal connected via one or more radio access points or radio access technologies.

Different networks and network technologies can be coupled with the aid of the Multi-radio Unification Protocol ("A Multi-Radio Unification Protocol for IEEE 802.11 Wireless Networks", Adya et. al, Proceedings of the first international conference on broadband networks, BROADNETS'04). This protocol is applicable to heterogeneous wireless communication networks using e.g. IEEE 802.11 and UMTS access technology. In such a network it is not only desirable to handoff the mobile terminal easily across the various networks; the mobile terminal may also be capable of communicating with more than one radio access point at the same time, using the respective radio access technique the access point supports.

The option of parallel data transmission leads inter alia to an increase of reliability of the connection and a higher data throughput. A further advantage of parallel transmission is the optimized use of different bandwidths offered by the respective access point, i.e. the respective access technology. Data related to different applications such as voice service or data download may be provided to the mobile terminal using a radio access technology offering the appropriate bandwidth, e.g. IEEE 802.11 may be used for high speed data packet services and UMTS may be used for voice services.

It may be even possible that within one application, e.g. the audio stream is provided by the radio access technique offering the lower bandwidth and the video stream is provided by the radio access technique offering the higher bandwidth.

Additional to bandwidth also the data delay is desired to be within a certain range, appropriate to the specific application. Some applications e.g. data download are delay insensitive, other services, like Voice-over-IP (VoIP) or video streaming are not.

In radio access networks, transmission of the same data flow via different radio access points is possible at different transmission time intervals (TTIs). This possibility implies a very dynamic switching of the radio access point and in some cases switching of the radio access technology as well.

In order to provide best quality of service to the mobile terminal in these radio access networks, a multi-radio Automatic Repeat Request (ARQ) mechanism is typically implemented. The term multi-radio ARQ means that link layer acknowledgements for data packets can be transmitted via a different radio access point than the one used for the data transmission. The motivation for introducing multi-radio ARQ mechanisms, is to avoid cases where the radio access point switching periods may be very long. This might happen in some cases when data and acknowledgement transmission are done via the same radio access point, as the delay on uplink and downlink may be significantly different.

To optimize system throughput and to minimize the signaling overhead it is desirable to resend a data packet only when this is needed and only on that specific part of the link where it is absolutely required. Further, in order to prevent abnormal situations in the sense that e.g. the transmission of the data flow stagnates, it is of interest to send acknowledgement messages without considerable delays. This delay times should be at least not higher than the ones observed in case of absence of a multi-radio ARQ mechanism. A further appropriate measure to minimize the control signaling overhead may be to prevent duplicated transmission of acknowledgement messages or duplicated retransmission of data packets.

In FIG. 1, an example of an heterogeneous radio access network is presented. A mobile terminal is in communication with a first Radio Access Point RAP 1 and a second Radio Access Point RAP 2. The first Radio Access Point RAP 1 is represented as an UMTS/HSDPA Node B with more functions so as to support the MUP protocol. The second Radio Access Point RAP 2 is a Wireless LAN Access Point that supports the IEEE 802.11g technology. For the sake of the simplicity of explanation, the description below will refer to this network configuration and hence to these radio access technologies. However, other radio access technologies may be considered without departing from the idea of the invention.

The first Radio Access Point RAP 1 and second Radio Access Point RAP 2 are connected via a wired link, preferentially a cable enabling a high-speed data transmission. Hence, the delay introduced when transmitting data and signaling between the first Radio Access Point RAP 1 and second Radio Access Point RAP 2 can be very small. A part of the wired link is shared with other connections between the first Radio Access Point RAP 1 and other Wireless LAN Access Points such as the access points RAP3 and RAP4 represented in FIG. 1. Since the wired connection is partly shared between different connections and between uplink and downlink, the load in the shared part may vary. This results in a varying delay on the communication part between the first Radio Access Point RAP 1 and the second Radio Access Point RAP 2. For the same reason, the same applies for the switching and queuing delay that is introduced in the connector shown in FIG. 1.

In the example shown in FIG. 1, downlink transmission, i.e. transmission from the network to the mobile terminal is considered. It is possible to transmit data packets of the same user flow via different Radio Access Points across different transmission time intervals (TTI). Hence, it is possible to switch dynamically the Radio Access Point from which the data transmission is done. In the case of tight coupling, this Radio Access Point switching may be done at TTI level. In this radio network configuration, multi-radio ARQ mechanisms are possible, i.e. acknowledgments associated with the data flow transmission of a single user may be transmitted using a different radio access technology than the one used for the data transmission. For this reason, there is a single link layer buffer located at the MUP protocol of one of the various radio access points, RAP1 in FIG. 1. This buffer is responsible for data retransmissions and therefore the acknowledgments, in particular the negative ones, of the user should reach it. In the network configuration considered in FIG. 1, the MUP buffer is located at the first Radio Access point RAP 1 that is a Node B. Therefore, the acknowledgments at MUP level should always reach the first Radio Access point RAP 1, even if the data transmission is performed by the second Radio Access point RAP 2.

It is readily understood that in this configuration, the second Radio Access Point RAP 2 supports a minimal MUP functionality, so as to be able to communicate with the first Radio Access point RAP 1. Therefore, the second Radio Access Point RAP 2 is considered to be an evolved Wireless LAN Access Point. The first Radio Access Point RAP 1 and second Radio Access Point RAP 2 need to communicate with established rules and therefore a communication protocol is needed. Various inter-RAP communication protocols may be conceived. An example of an RAP Communication Protocol (RAPCP) is given in the co-pending European patent application 06 006 872.3. Therein, the main messages and procedures of this communication between a first Radio Access Point RAP 1 and a second Radio Access Point RAP 2 are described. Among others, therein the message with which packets to be transmitted are forwarded from the first Radio Access point RAP 1 to the second Radio Access Point RAP2 is defined. In addition, in this application, a procedure where only positive or negative acknowledgements are forwarded from the second Radio Access Point RAP 2 to the first Radio Access Point RAP 1 is described. Moreover, it is also defined therein that first Radio Access Point RAP 1 periodically polls the second Radio Access Point RAP 2 asking for information on the acknowledgments received by the second Radio Access Point RAP 2.

In addition, it is readily deduced that the station terminal supports both radio access technologies; so that the mobile terminal is able to implement both UMTS and IEEE 802.11 radio access technologies. It is assumed that at a given time interval, the station terminal is able to operate only in one radio access technology, so that simultaneous transmissions via both radio access technologies is not possible.

In the co-pending European patent applications 05 027 218.6 and 06 006 872.3 also due to the applicant, it is proposed that a Radio Access Point to which a mobile terminal sends an acknowledgment message be selected within the mobile terminal receiving data packets. The mobile terminal determines the Radio Access Point to which it sends an acknowledgment message based on the delay that the acknowledgment experiences when it is transmitted to the Radio Access Point with the MUP buffer and on the channel quality of the channels to the various Radio Access Points. In order to make this selection, the mobile terminal needs to have information on the delay and on the channel quality on the various Radio Access Points. This information is transmitted over the air to the mobile terminal. However, in the respective proposed systems, the signaling overhead over the air is relatively high and the information on the transmission delays on the various paths that is available may often be inaccurate, thus leading to a non-optimal selection of the Radio Access Point to which an acknowledgment message should be transmitted.

In a scenario where multi-radio ARQ mechanisms are implemented, the need for a timely transmission of acknowledgments is more intense. The reason is that access systems of more than one radio accesses are expected to lead to higher data rates than in single radio systems and therefore the associated acknowledgments need to be transmitted with a lower delay than the one needed in single-radio systems. Otherwise, delayed acknowledgments may stall the data transmission. The co-pending European patent application 05 027 218.6 presents a mechanism wherein a multi-radio terminal station selects the Radio Access Point to which the multi-radio terminal station transmits its acknowledgment message. The radio access system scenario is the one presented in FIG. 1. The Radio Access Point selection is based on the channel quality that the different radio accesses exhibit and on the delay that the transmission of the acknowledgment experiences when it is transmitted via the different available paths.

The information that is needed at the station terminal is signaled over the air. A first indispensable parameter for the operation of this algorithm is the delay of the acknowledgment transmission in the wired part; i.e. on the wired link connecting the first Radio Access point RAP 1 with the second Radio Access Point RAP 2. This parameter is explicitly signaled to the multi-radio station terminal. There are two options for the signaling of the delay in the wired part.

The first option is that the delay of an acknowledgment transmission is measured very frequently in the wired part. In this case, this updated delay information is signaled to the station terminal, upon reception of a new delay value. This case involves significant signaling overhead. In addition, upon arrival of a new delay value, this last value is forwarded to the MUP protocol of the station terminal and the Radio Access Point selection algorithm takes place. The assessment of the delay that is involved in this forwarding of the new transmission delay via primitives inside the station terminal and the execution of the Radio Access Point selection algorithm is not straightforward. However, some additional delay has to be expected. This might be an additional effect that has to be considered in the case of frequent updates of the delay value.

The second option for the measurement of the delay in the wired part and for its signaling to the station terminal is to perform this procedure less frequently. In this case, the signaling overhead is not so significant. In addition, the delays involved by the forwarding of the delay transmission value and the Radio Access Point execution algorithm are avoided, since these procedures are performed only upon arrival of a new delay value. This second option is suitable in scenarios where the delay in the wire connecting the Radio Access Points is not varying very dynamically. However, in the case where the connecting wire is shared among different Radio Access Points and carries traffic and signaling on both directions, the delay is expected to vary dynamically. In case this second option is applied when the delay in the wire is varying dynamically, then unwanted situations like the one described in the co-pending European patent application 06 006 872.3 occur.

The European patent application 06 006 872.3 discloses a solution in the case where the value of the delay on the wired part that the station terminal uses for its Radio Access Point selection algorithm is not the one that is observed at the wired part at this current instant. Namely, this application deals with the situation where the current delay in the wired part is smaller than the delay value that the station terminal uses for the Radio Access Point selection algorithm. A second Radio Access Point RAP 2 is an Wireless LAN Access Point that operates according to the IEEE 802.11 technology. In this case, the second Radio Access Point RAP 2 forwards a negative acknowledgment to the first Radio Access Point RAP1 and the negative acknowledgment reaches the MUP buffer located in the first Radio Access Point RAP 1 before the acknowledgment that the station terminal transmits to the first Radio Access Point RAP 1, thus potentially leading to contradictory acknowledgments.

SUMMARY OF THE INVENTION

The object of the invention is to provide a method allowing for improving the robustness in the transmission of an acknowledgment message by a mobile terminal to a network, while minimizing a signaling overhead.

The problem is solved by the subject matter of the independent claims. Advantageous embodiments of the invention are subject matter of the dependent claims.

One embodiment of the invention provides a method for transmitting data packets in a network, wherein the network comprises at least one mobile terminal and at least a first and a second access point, wherein said first and second access point are connected to each other over a link. The method comprises selecting, by said first access point, one of said first and second access point as a transmission destination of an acknowledgment message indicating information on a delivery of a data packet at the mobile terminal, based on at least one of a transmission delay on the link and a network coverage of the mobile terminal provided by at least one of the first and second access point, notifying, by said first access point, said mobile terminal about a selection result of the transmission destination of the acknowledgment message, transmitting, by said first access point, a data packet to said mobile terminal, and transmitting, by said mobile terminal, an acknowledgment message to the one of said first and second access point selected as the transmission destination of the acknowledgment message.

In a preferred embodiment of the invention, said first and second access point are connected to each other over a wired link.

In another embodiment of the invention, said first and second access point respectively employ a first and second radio access technology different from one another, and said mobile terminal communicates with one of said first and second radio access technology at a predetermined time.

In yet a preferred embodiment of the invention, said first access point is an IEEE 802.11 access point and said second access point is an UMTS/HSDPA access point.

In another embodiment of the invention, said first and second access point and mobile terminal implement a Multi-Radio Unification Protocol.

In an advantageous embodiment of the invention, said first access point transmits to said mobile terminal said selection result of the transmission destination of the acknowledgment message along with the transmitted data packet.

According to an embodiment of the invention, the method further comprises transmitting, by said first access point, the received acknowledgement message to said second access point, when said first access point is selected as the transmission destination of the acknowledgment message.

In yet another embodiment of the invention, the method further comprises transmitting, by said first access point, a negative acknowledgement message to said second access point indicating an unsuccessful delivery of said data packet at said mobile terminal, when said first access point is selected as the transmission destination of the acknowledgment message and no acknowledgment message has been received by said first access point.

In an embodiment of the invention, the method further comprises determining, by said first access point, whether said mobile terminal is in a coverage area of said first access point and/or said second access point.

According to an embodiment of the invention, when said mobile terminal is determined to be in the coverage area of said first and second access point, said method further comprises comparing, by said first access point, a first transmission delay of an acknowledgment message sent to said first access point and then transmitted over the link to the second access point and a second transmission delay of an acknowledgment message sent to said second access point with each other, and selecting, by said first access point, one of said first and second access point as the transmission destination of the acknowledgment message based on the comparison result.

In an alternative embodiment of the method, when said mobile terminal is determined to be in the coverage area of one of said first and second access point, said first access point selects the one of said first and second access point as the transmission destination of the acknowledgment message.

In a variant of an embodiment of the invention, when said second access point is selected as the transmission destination of the acknowledgment message, said method further comprises reserving, by said first access point, a transmission channel for data transmission from said first access point to said mobile terminal only for a time duration necessary for completing data transmission, thereby suppressing an additional time duration for transmission of an acknowledgment message.

In yet another embodiment of the invention, said first and second access point and said mobile terminal implement a Multi-Radio Unification Protocol, the selection of the one of said first and second access point as the transmission destination of the acknowledgment message is performed within the Multi-Radio Unification Protocol at the first access point, and the selection result is notified to the Media Access Control layer along with the data packet to be transmitted.

In a preferred embodiment of the invention, the selection result is comprised in a header of a Media Access Control data packet.

Another embodiment of the invention provides a system comprising at least one mobile terminal and a network comprising at least a first and a second access point, said first and second access point being connected to each other over a link, wherein said first access point comprises selecting means for selecting one of said first and second access point as a transmission destination of an acknowledgment message indicating information on a delivery of a data packet at the mobile terminal, based on at least one of a transmission delay on the link and a network coverage of the mobile terminal provided by at least one of the first and second access point, notifying means for notifying said mobile terminal about a selection result of the transmission destination of the acknowledgment message, and transmitting means for transmitting a data packet to said mobile terminal, and said mobile terminal comprises transmitting means for transmitting an acknowledgment message to the one of said first and second access point selected as the transmission destination of the acknowledgment message.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 2:
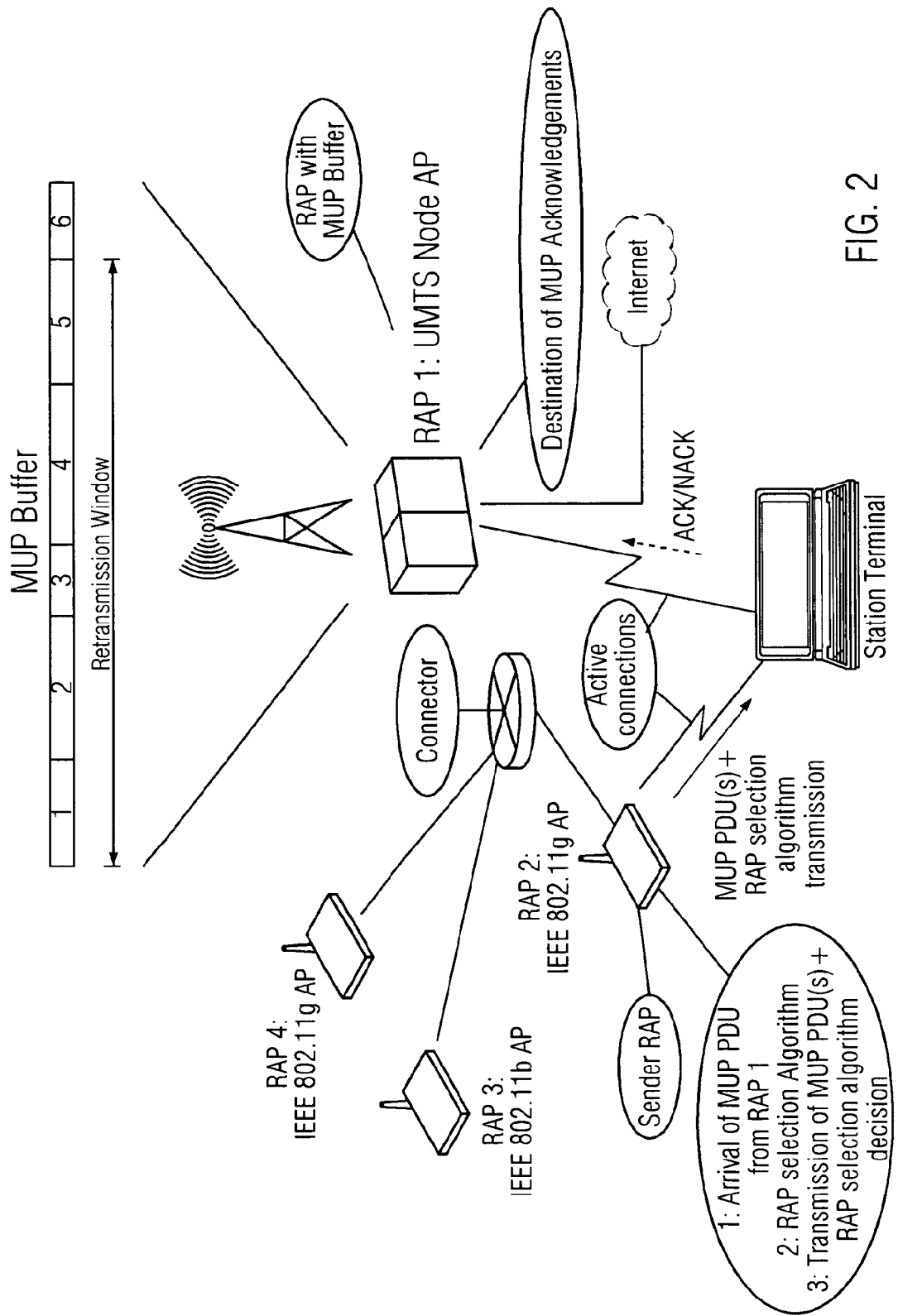
FIG. 2 is a representation of a method according to one embodiment of the invention in the radio access network scenario shown in FIG. 1.

FIG. 2 shows a network wherein a mobile terminal is connected to a UMTS Node B and an IEEE 802.11g access point. Radio access point RAP 1 is a UMTS node B, radio access points RAP 2, RAP 3 and RAP 4 are W-LAN access points implementing different variants of the IEEE 802.11 standard. The cooperation of UMTS and IEEE 802.11 is exemplarily depicted, however other radio access technologies may be considered.

The invention is not limited to these kinds of networks, it can be applied to a variety of different heterogeneous networks. Such a heterogeneous network may comprise different network technologies such as IEEE 802.11 and UMTS, CDMA 2000, Bluetooth, GSM, standards for satellite communication, etc.

Also a scenario wherein all access points support the same access technology can be imagined, e.g. a network of IEEE 802.11g access points. It can also be extended to non infrastructure-based networks, such as ad hoc or mesh networks.

Also different network topologies may be realized e.g. in that additional gateways to other communication networks exist or the control entity is located in another radio access point, or in a different network system.

A data packet service, e.g. a data download from the Internet, can be provided to the mobile terminal via access point RAP 2. The data packets downloaded from the Internet are forwarded by the control entity to the access network. The downloaded data is transmitted along a path using the wired link from access point RAP 1 via the network switch to access point RAP 2, and finally reaching the mobile terminal via the air interface.

The mobile terminal simultaneously communicates with the control entity via a UMTS Node B, the Radio Access Point RAP1, and the W-LAN access point RAP2. The control entity may be located in access point RAP 1. The access points may implement the Multi-Radio-Unification Protocol (MUP). The implementation of the MUP protocol allows the implementation and use of multi-radio automatic-repeat-request (ARQ) mechanisms.

A MUP-buffer providing data packets for transmission and retransmission of a data packet service to the mobile terminal may be further a part of the control entity. This MUP buffer can act as a common transmission buffer containing transmission and retransmission counters, transmitted physical data units (PDUs) and associated variables. The MUP buffer may be controlled by the control entity that is a part of the MUP network layer. Acknowledgement messages, acknowledging the delivery of data packets of the data packet service are evaluated by the control entity.

In this illustrative example, access point RAP 1 supports UMTS/HSDPA (High Speed Downlink Packet Access) technology, whilst access point RAP 2 supports the IEEE 802.11 technology. These two different radio access points are physically coupled with the aid of a wired link. Coupling of the respective radio access technologies is provided by the use of the MUP protocol. The MUP protocol is used so as to assure unified data link layer processing and a common interface to the IP network. The mobile terminal communicates, i.e. it has activated communication sessions, with both radio access points, using the respective radio access technology. Access point RAP 1 contains the MUP re-transmission buffer and the interface to the IP protocol; hence it is the gateway to the IP network. If the mobile terminal is communicating with the IP network via access point RAP 2, this access point needs to communicate with the access point RAP 1. The wired link, connecting the two access points, can be a point to point connection, or the link can be shared by a plurality of access points as it is shown in FIG. 2. In case the wired link is shared, a switch is used so as to direct traffic to/from different access points from/to the access point comprising the MUP buffer RAP 1. In FIG. 2, the two access points RAP1 and RAP2 communicate via an appositely defined communication protocol, the MUP Communication Protocol. The control signaling is done with the aid of this protocol.

The MUP protocol enables dynamic switching of radio access points providing the data service to the mobile terminal. The different radio access points involved in this switching process might support the same, or different radio access technologies. Due to this possibility, the same data flow may be provided to the mobile terminal via different radio access points. The switching of radio access points may be in certain cases very dynamic, i.e. it may be performed at time periods of a transmission time interval (TTI).

In the case of very dynamic access point switching, the optimum system performance may be achieved, if a multi-radio ARQ mechanism is implemented. It is very likely that data and acknowledgment transmission via the same radio access point might lead to very long access point switching periods. In such a case the potential of the coupled network (e.g. with respect to data throughput) is not exploited to the maximum.

The term multi-radio ARQ means that link layer acknowledgements for certain data packets can be transmitted via a different radio access point than the one used for the data transmission. This mechanism requires that acknowledgment messages are transmitted without considerable delays, or at least with delays that are not higher than the ones observed in the case of absence of a multi-radio ARQ mechanism.

In a network that implements the MUP protocol, and access point switching is performed very dynamically, the mobile terminal can transmit an acknowledgment message for one data packet (PDU) to a radio access point different from the one that is used for the downlink data transmission of this specific data packet.

Figure 1:
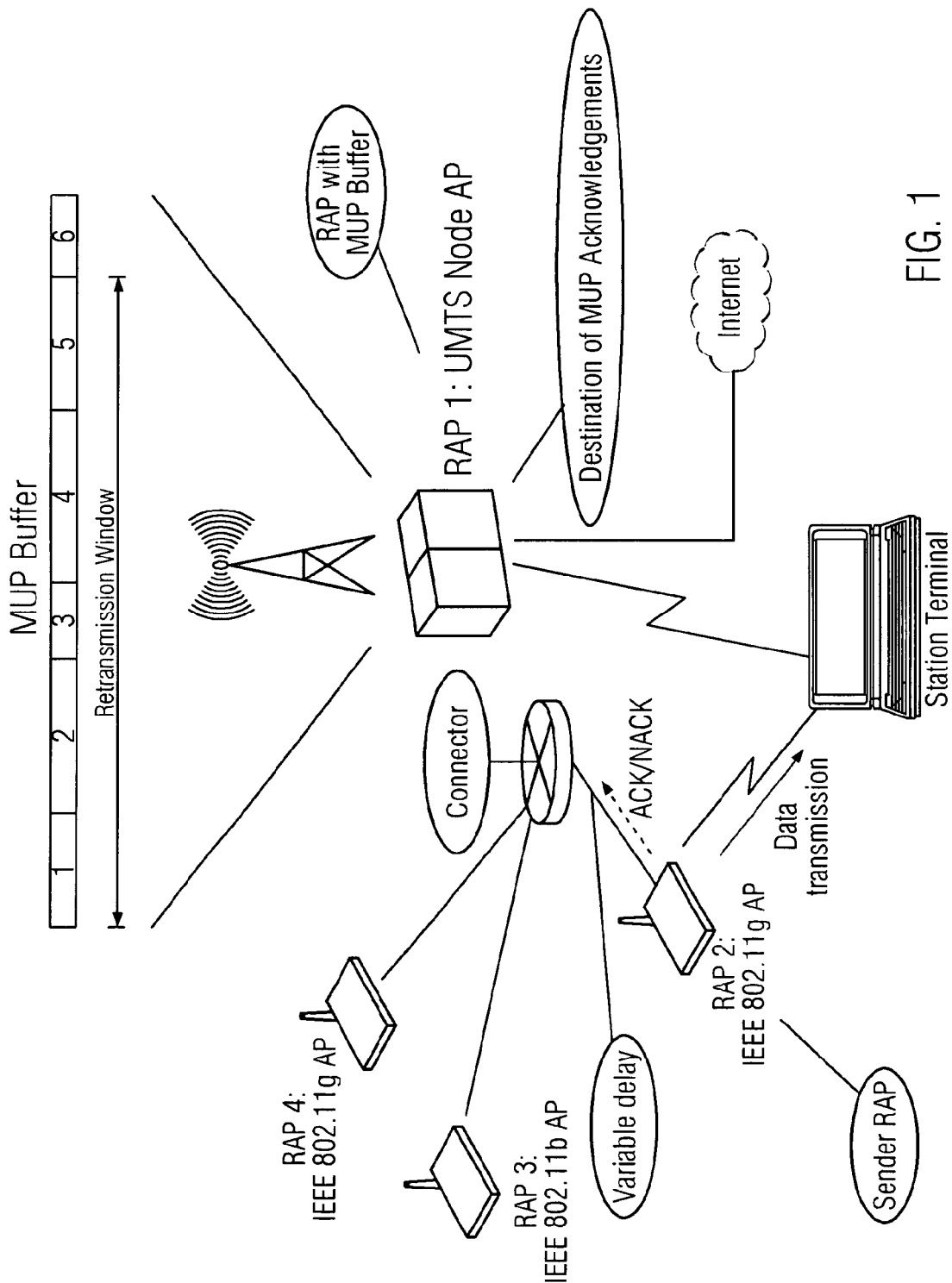
FIG. 1 shows a heterogeneous radio access network wherein a mobile terminal is connected to a UMTS Node B and an IEEE 802.11g access point.

FIG. 2 represents an embodiment of the invention applied to the exemplary radio access network shown in FIG. 1. Upon arrival of a MUP data packet from the first Radio Access Point RAP 1 at the second Radio Access Point RAP 2, the second Radio Access Point RAP 2 performs a selection of one of the first Radio Access Point RAP 1 or the second Radio Access Point RAP 2 that will receive an acknowledgment message transmitted by the station terminal. This selection procedure may be performed according to the steps shown in FIG. 3.

After performing the Radio Access Point selection, the second Radio Access Point RAP 2 transmits the MUP data packet and the decision result of the Radio Access Point selection to the station terminal. The station terminal, upon reception of the MUP data packet, transmits the acknowledgment message indicating information on the delivery of the data packet, to the selected Radio Access Point that the second Radio Access Point RAP 2 has indicated. In the particular example illustrated in FIG. 2, the Radio Access Point selection algorithm is such that the station terminal should transmit the acknowledgment message to the first Radio Access Point RAP 1.

The Radio Access Point that executes the selection procedure, the second Radio Access Point RAP 2 in FIG. 2, needs to have information on at least one of two parameters. The first parameter is the delay that the acknowledgment experiences when it is transmitted via the different paths. The second parameter is the information on whether the station terminal is in the coverage area of the first and second Radio Access Point RAP 1, RAP 2 or in the coverage area of one of them.

The delay on the different paths is available at the transmitting Radio Access Point, i.e. the second Radio Access Point RAP 2 in the example considered in FIG. 2. The delay on the wired link can be measured on either parts of the wire. Several methods of measuring this delay can be conceived. An example of a simple measurement method based on polling is presented in the European patent application 05 027 218.6 mentioned above. When using such a method, information on the delay in the wired part is available at the transmitting Radio Access Point RAP 2 at any time.

The delay of transmission that is observed in the air interface can also be transmitted to the transmitting Radio Access Point RAP 2. Indeed, the first Radio Access Point RAP 1 supports the UMTS/HSDPA technology. Hence, the transmission delay of an acknowledgment message in UMTS/HSDPA is equal to the Transmission Time Interval (TTI). The TTI of a dedicated channel is known to the first Radio Access Point RAP 1 and this information can thus be forwarded via the wired connection to the transmitting Radio Access Point RAP 2.

In case of a radio access system configuration that is different from the one represented in FIG. 2, the first Radio Access Point RAP 1 might be a WLAN Access Point, as the transmitting Radio Access Point RAP 2. In this case, the exact value of the delay of the acknowledgment transmission from the station terminal to the first Radio Access Point RAP 1 directly over the air interface cannot be assessed. The reason is that the station terminal has to perform a random access procedure on the shared contention based WLAN channel. The delay that this procedure introduces cannot be directly evaluated. An approximation of this delay value however can be obtained. This approximation can be based, for instance, on the contention window size. The delay of the random access procedure is proportional to the contention window size. The value of the contention window size is known at a WLAN Radio Access Point AP. Hence, the approximate delay for an acknowledgment transmission from the station terminal to the first Radio Access Point RAP 1 is available at the first Radio Access Point RAP 1. This approximated value of the delay can be notified to the second Radio Access Point RAP 2 via the wired link connecting the first and second Radio Access Point RAP 1, RAP 2.

The second parameter based on which the transmitting Radio Access Point RAP 2 may select the Radio Access Point to which the station terminal should send the acknowledgment message indicating information on the delivery of data packets is the coverage provided by the first and second Radio Access Point RAP 1 and RAP 2, with which the station terminal is communicating.

In the following, it will be shown that this information is available at a Radio Access Point. The transmitting Radio Access Point RAP 2 knows whether the station terminal is within its coverage as it receives the pilot signal from the station terminal. Similarly, the Radio Access Point RAP that does not ensure data transmission to the station terminal, i.e. the first Radio Access Point RAP 1, knows whether the station terminal is within its coverage area, since it receives the pilot signal from the station terminal. This information can be forwarded to the transmitting Radio Access Point RAP 2 via the wired connection. Hence, the transmitting Radio Access Point, whichever this one is, knows whether the station terminal is within the coverage area of both Radio Access Points. This information is exchanged via the wired connection, hence no signalling overhead over the air-interface is added.

The information on the Radio Access Point coverage that the transmitting Radio Access Point RAP 2 uses for the execution of the Radio Access Point selection algorithm may not be the current one, i.e. the information about the coverage provided by the first Radio Access Point RAP 1 to the station terminal that is available at the second Radio Access Point RAP 2 may be the information that the first Radio Access Point RAP 1 had transmitted to the second Radio Access Point RAP 2 some time ago. In case the delay on the wired link is high, then the information at the second Radio Access Point RAP 2 may be out of date. However, this out-of-date information may not always lead to non-optimal decisions in the Radio Access Point selection algorithm, especially when the station terminal is moving with low speed. Indeed, in such a case, it is very unlikely that the station terminal is coming out of the coverage area of the first Radio Access Point RAP 1 within short time intervals. In case the delay on the wired part is in the order of few dozens of msecs, then it is expected that the information on the coverage of the first Radio Access Point RAP 1 that is available at the second Radio Access Point RAP 2 is not really out-of-date, even for station terminals with very high speeds, of up to 200 km/h.

Another option for the notification of coverage from the station terminal to the transmitting Radio Access Point relies in that the station terminal uses the information on the downlink pilots that it receives from the various Radio Access Points and then signals this information to the Radio Access Points.

In the co-pending European patent application 06 006 872.3, a problem that may arise when the sender Radio Access Point RAP 2 is an Wireless LAN Access Point is that the station terminal may decide to transmit a negative acknowledgment to the first Radio Access Point RAP 1 while the second Radio Access Point RAP 2 is waiting for an acknowledgment from the station terminal. In case no acknowledgment from the station terminal reaches the second Radio Access Point RAP 2 within the time period defined by the "Duration" field of the Clear To Send message, then the second Radio Access Point RAP 2 considers that the delivery of the data packets to the station terminal was not successful. Thereafter, it forwards a negative acknowledgment to the first Radio Access Point RAP 1. As a result, more than one acknowledgement message, that may possibly be contradictory, reach the first Radio Access Point RAP 1. The method according to an embodiment of the invention allows for preventing such problem, since the sender Radio Access Point RAP 2 is aware of the selected Radio Access Point to which the station terminal transmits its acknowledgment message. Hence, the second Radio Access Point RAP 2 forwards a negative acknowledgment to the first Radio Access Point RAP 1 only in case according to the Radio Access Point selection algorithm, the station terminal should have sent the acknowledgment to the second Radio Access Point RAP 2 and the second Radio Access Point RAP 2 has not received an acknowledgment from the station terminal.

Figure 3:
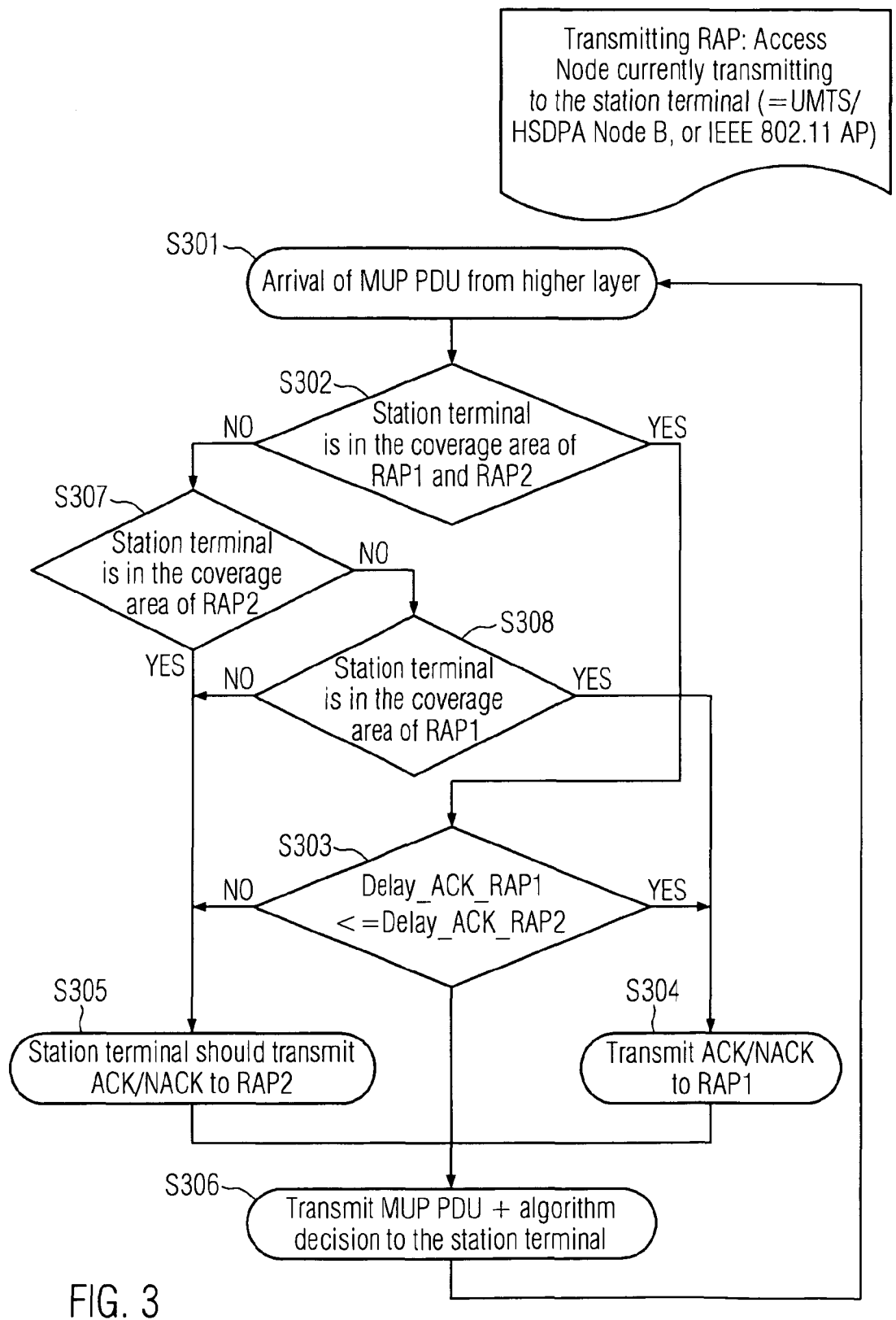
FIG. 3 displays the method executed by the Radio Access Point performing data transmission upon reception of a MUP data packet over the air before performing the transmission of the received MUP data packet to the station terminal.

FIG. 3 shows an exemplary procedure that is executed within the transmitting Radio Access Point RAP 2 for selecting the Radio Access Point to which the station terminal should send its acknowledgment message.

Upon arrival of a MUP data packet from the higher layer of the MUP protocol, in step S301, the algorithm first tests, in step S302, whether the station terminal is in the coverage area of the Radio Access Points RAP 1 and RAP 2. If the station terminal is in the coverage area of both Radio Access Points RAP 1 and RAP 2, then it is tested which path exhibits the shortest delay of acknowledgment transmission (S303). In case the delay for an acknowledgment transmission from the station terminal directly to the first Radio Access Point RAP 1 is shorter than a delay of the acknowledgment transmission from the station terminal to the second Radio Access Point RAP 2 and then over the wired link to the first Radio Access Point RAP 1, the acknowledgment transmission is thus performed directly to the first Radio Access Point RAP 1 (S304). In case the delay for an acknowledgment transmission from the station terminal directly to the first Radio Access Point RAP 1 is higher than a delay of the acknowledgment transmission from the station terminal to the second Radio Access Point RAP 2 and then over the wired link to the first Radio Access Point RAP 1, the acknowledgment transmission is thus performed to the second Radio Access Point RAP 2 (S305). Upon completion of the selection procedure of the Radio Access Point to which the acknowledgment message is transmitted by the mobile terminal, the second Radio Access Point RAP 2 transmits the MUP data packets to the station terminal along with the Radio Access Point selection result (S306).

In case the station terminal is not in the coverage area of both Radio Access Points RAP 1 and RAP 2, then the algorithm decides that the station terminal should transmit the acknowledgment to the Radio Access Point that offers coverage to the station terminal. In step S307, it is first determined whether the station terminal is in the coverage area of Radio Access Point RAP 2. In case the station terminal is in the coverage area of Radio Access Point RAP 2, then the station terminal transmits the acknowledgment to the second Radio Access Point RAP 2 (S305). In case the station terminal is not in the coverage area of Radio Access Point RAP 2, then it is determined whether the station terminal is in the coverage area of the first Radio Access Point RAP 1 (S308). In case the station terminal is in the coverage area of the first Radio Access Point RAP 1, then the station terminal transmits the acknowledgment to the first Radio Access Point RAP 1 (S304).

In case the station terminal is not in the coverage area of the first Radio Access Point RAP 1 either, i.e. in case neither of the first Radio Access Point RAP 1 and second Radio Access Point RAP 2 provides coverage to the station terminal, then the station terminal transmits the acknowledgment to the second Radio Access Point RAP 2 (S305) as the second Radio Access Point RAP 2 is the Radio Access Point ensuring data transmission to the station terminal. This is the most sensible option, because this solution exhibits the simplest implementation and it involves the lowest complexity and the lowest signalling overhead.

In reality, it is expected that if one Radio Access Point provides coverage to the station terminal, this Radio Access Point is very likely to be the one that is currently transmitting MUP data packets to the station terminal. Hence, in case the station terminal is not in the coverage area of both Radio Access Points, the decision of the algorithm is that the station terminal should transmit its acknowledgment to the Radio Access Point that transmits MUP data packets to the station terminal.

Even though it is described herein that the algorithm is executed within the Radio Access Point that transmits MUP data packets to the station terminal, independently from the nature of the Radio Access Point considered, the execution of the Radio Access Point selection algorithm is however more advantageous in the case that the MUP data transmission is done from a Radio Access Point that supports the IEEE 802.11 technology. Indeed, in case the data transmission is done via a Radio Access Point that supports the UMTS technology, i.e. a Node B, and the other Radio Access Point, that does not ensure data transmission, supports the IEEE 802.11 technology, it would be less advantageous to execute a Radio Access Point selection algorithm within the UMTS Node B so as to decide whereto the station should transmit its acknowledgment. The reason is that in UMTS/HSDPA technology, the user that receives data from the Node B is allocated a dedicated uplink signalling channel. Hence, the delay for the acknowledgment transmission is expected to be lower than in the case where the acknowledgment is transmitted to the second Radio Access Point RAP 2 which supports the IEEE 802.11 technology, since the acknowledgment transmission via the second Radio Access Point RAP 2 involves a channel reservation mechanism and the transmission via the wired part. Hence, it is unlikely that the transmission via the second Radio Access Point RAP 2 exhibits lower delay than the transmission via the first Radio Access Point RAP 1.

This statement is particularly true when the access system architecture is the one represented in FIG. 2 and one of the basic criteria considered for the Radio Access Point selection algorithm is the transmission delay. Indeed, it is estimated that in the future there is a high possibility of connecting several evolved Wireless LAN Access Points to an UMTS/HSDPA Node B. The other case where UMTS/HSDPA Node Bs are connected to a Wireless LAN Access Point is less likely to appear. Further, one of the basic criteria considered for the Radio Access Point selection algorithm is the transmission delay, since the principal requirement for an acknowledgment transmission is that the acknowledgment is transmitted with the least delay. Robustness is also an important requirement for the acknowledgment transmission and can be in most of the cases guaranteed by checking whether the user is in the coverage area of a Radio Access Point, without checking the instantaneous channel quality of the radio channel that connects the station terminal with the Radio Access Point.

Figure 4:
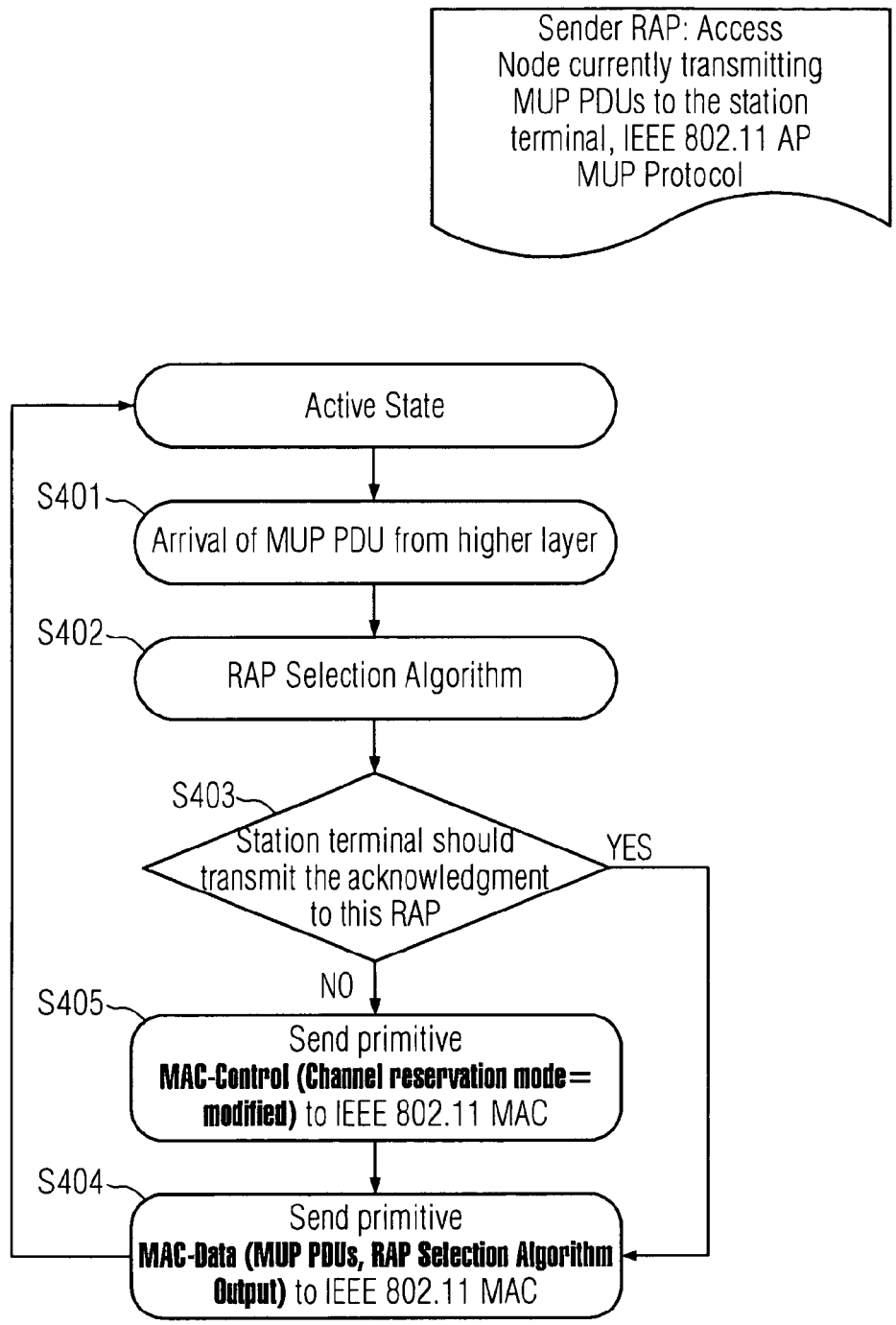
FIG. 4 shows the exchange of primitives between the MUP and MAC protocol of the Radio Access Point performing data transmission.

FIG. 4 shows an implementation of the procedure with which the Radio Access Point selection algorithm output is forwarded from the MUP layer to the MAC layer. It shows the procedure followed upon arrival of MUP data packets from the first Radio Access Point RAP 1. This procedure is complementary to the one described in FIG. 3, as it is going to be explained below.

Upon arrival of MUP data packets from the Radio Access Point RAP 1 with the MUP buffer (S401), the Radio Access Point selection algorithm is performed. The Radio Access Point selection algorithm may be, for instance, the one presented in FIG. 3. Once the Radio Access Point selection is executed (S402), it is tested whether the station terminal should transmit its acknowledgment for this MUP data packet transmission to the Radio Access Point selected within the MUP protocol (S403). If it is the case, then the MUP protocol forwards the MUP data packets to be transmitted to the MAC protocol with the aid of the MAC-Data primitive (S404). This primitive contains the MUP data packets and the Radio Access Point selection result. This primitive is transmitted via the MAC Service Access Point MAC-SAP shown in FIG. 7.

In case the output of the Radio Access Point selection algorithm is that the station terminal should transmit the acknowledgment to the Radio Access Point with the MUP buffer directly, i.e. the first Radio Access Point RAP 1 in FIG. 2, then the MUP protocol notifies the MAC protocol that it can reserve the channel for this data transmission according to a modified channel reservation mode which will be described in the following (S405). A primitive is transmitted via the MAC-SAP to the IEEE 802.11 MAC layer to notify this modified channel reservation mode. In addition, MUP data packets to be transmitted to the station terminal are also forwarded to the MAC protocol.

Other implementation options may be considered, as long as the Radio Access Point selection is performed within the MUP protocol of the sender Radio Access Point and the Radio Access Point selection output is forwarded to the MAC protocol along with the MUP data packets to be transmitted.

The insertion of the Radio Access Point selection result within a MUP data packet may depend on the radio access technology considered. In the case of IEEE 802.11, a possible approach would be to transmit this information along with the MUP data packets to be transmitted. In this case, MUP data packets and the Radio Access Point selection result are considered as MAC data at the MAC layer. The whole information is then transmitted as a unique MAC data packet from the physical layer. This approach is not inline with the conventional approach of transmitting separately, i.e. via separate channels, data and control information, due to the need of guarantying that the transmission of control is more robust than the data transmission. The reason is that this is not feasible to make this separation at MAC level in IEEE 802.11 systems. Hence, it is not possible to guarantee a more robust Radio Access Point selection output transmission at this level. In IEEE 802.11 systems this is possible only at physical layer. The reason is that there is no structure of logical, transport channels, similar to the one of e.g. UMTS.

Figure 5:
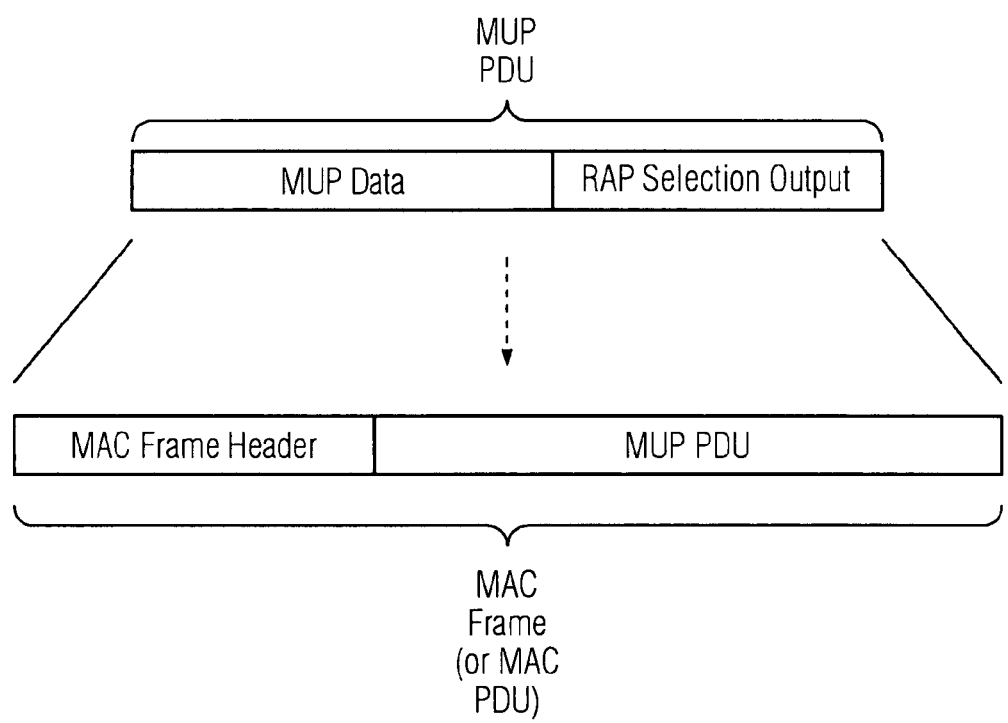
FIG. 5 shows an embodiment of a mapping of the Radio Access Point selection algorithm output into a MAC data packet in the IEEE 802.11 protocol.

Consequently, if a robust transmission of the Radio Access Point selection output is required, then this information should be sent via the physical channel that transmits the MAC headers. Hence, in such a case, the transmission selection output is handled as a MAC header. This means that information of the MUP protocol is forwarded to the MAC protocol, where it is also considered as protocol information, which needs to be signaled. An example of a MAC frame is shown in FIG. 5, wherein the Radio Access Point selection output of the MUP data packet is inserted into a MAC header of the MAC data packet.

In case the Radio Access Point ensuring data transmission supports the IEEE 802.11 technology, then the Radio Access Point selection result can be treated separately at MAC layer and transmitted via specific control channels, e.g. dedicated signaling transport channels that are associated with dedicated signaling radio bearers, or via the high speed dedicated, Uplink or Downlink, signaling channel in HSDPA.

Figure 6A:
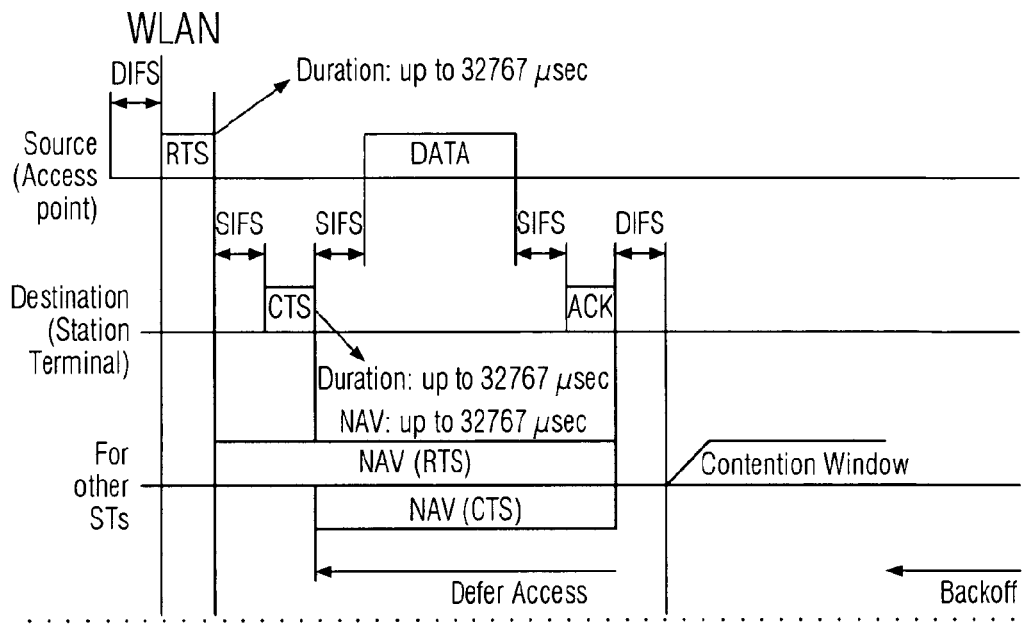
FIG. 6a presents a nominal channel reservation mechanism in IEEE 802.11.
Figure 6B:
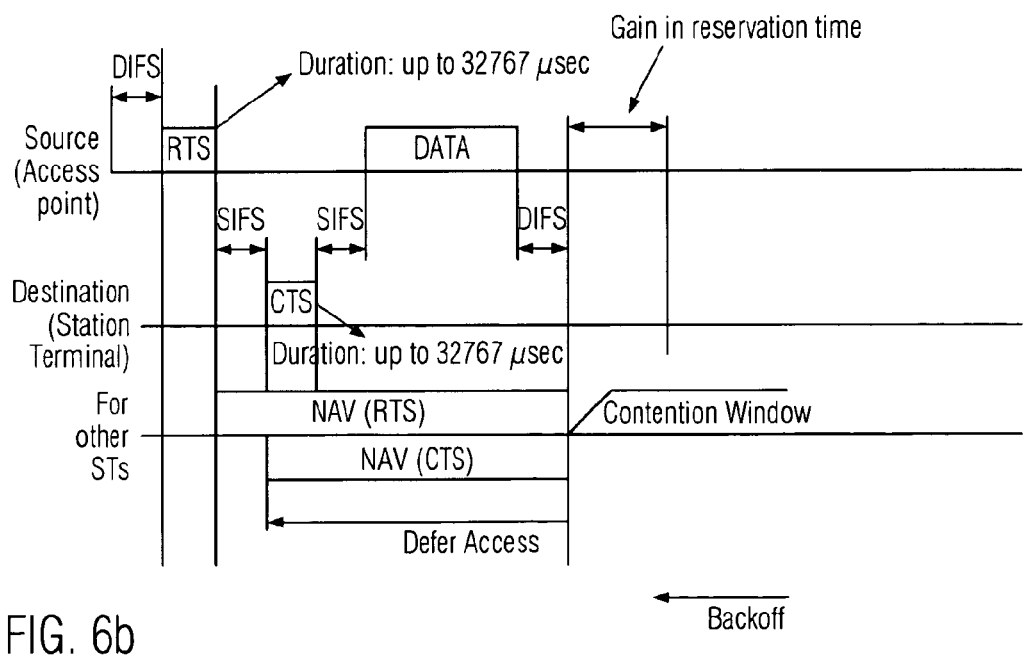
FIG. 6b presents a channel reservation mechanism in IEEE 802.11 according to one embodiment of the invention.

FIG. 6a shows a nominal method of channel reservation according to the IEEE 802.11 protocol specification, while FIG. 6b shows a modified method of channel reservation according to one embodiment of the invention.

An additional gain can indeed be obtained in the case where the Radio Access Point RAP 2 ensuring downlink data transmission is a Wireless LAN Access Point by modifying the channel reservation mechanism. The modification proposed herein consists in reserving the channel only for the time during which the MUP data packet transmission to the station terminal occurs, in case the Radio Access Point selection result is such that the station terminal should transmit to the first Radio Access Point RAP 1. Hence, no additional time is reserved for the acknowledgment transmission from the station terminal to the second Radio Access Point RAP 2. As a result, the channel is free just after the MUP data packet transmission to this specific station terminal and therefore the channel can be reserved for other station terminals. This modified channel reservation method according to this embodiment of the invention allows for improving the spectral efficiency of the radio access system. In the following, the gain in the channel reservation time provided by this modified channel reservation method in comparison with the conventional channel reservation according to the IEEE 802.11 specification will be described.

In FIG. 6a, according to the nominal channel reservation procedure, the station terminal, in case it is the entity that initiates the communication, transmits a Request To Send a message RTS to the IEEE 802.11 protocol. In case the IEEE 802.11 Access Point decides to initiate the communication with the station terminal that requested for it, then the IEEE 802.11 Access Point transmits a Clear To Send CTS message to the station terminal in question. This message contains among other fields a field called "Duration". This field specifies the time duration over which the channel is reserved for the communication with the designated station terminal. This message is broadcasted and therefore all the station terminals within the coverage area of the IEEE 802.11 Access Point listen to it. Upon reception of the CTS message, the station terminals, which are not the recipient of this message, remain inactive till the end of the "Duration" time window. This duration period accounts for both the time duration needed for the data transmission and for the time duration needed for the acknowledgment transmission from the receiver to the transmitter.

In FIG. 6b, the modification of the channel reservation procedure according to one embodiment of the invention is described. This modified channel reservation procedure applies to the case where the second Radio Access Point RAP 2 ensures the data transmission to the mobile terminal and the Radio Access Point selection result is such that the mobile terminal should transmit the acknowledgment to the first Radio Access Point RAP 1. The channel reservation procedure is similar to the nominal procedure, with the difference that the duration over which the channel is reserved accounts only for the time that is required for the data transmission from the second Radio Access Point RAP 2 to the mobile terminal and not for the time that is required for the acknowledgment transmission from the mobile terminal to the second Radio Access Point RAP 2. Indeed, when the Radio Access Point selection result is such that the station terminal should transmit the acknowledgment to the first Radio Access Point RAP 1, no acknowledgment is expected by the second Radio Access Point RAP 2 from the mobile terminal. By using the modified channel reservation procedure according to this embodiment of the invention, the channel can thus be made available to other users earlier than when using the conventional channel reservation procedure according to the IEEE 802.11 specification, thus leading to a gain in reservation time as shown in FIG. 6b.

In case the RAP selection algorithm makes the decision that the station terminal should transmit the acknowledgement back to itself, then the channel reservation procedure is the nominal one; hence; the duration field is set so that it accounts for both the data and acknowledgment transmission. The IEEE 802.11 MAC protocol decides which reservation mechanism to use on the basis of the RAP selection algorithm output. The output of this RAP selection algorithm is notified to the IEEE 802.11 MAC protocol by the MUP protocol with the aid of an appositely defined primitive.

Figure 7:
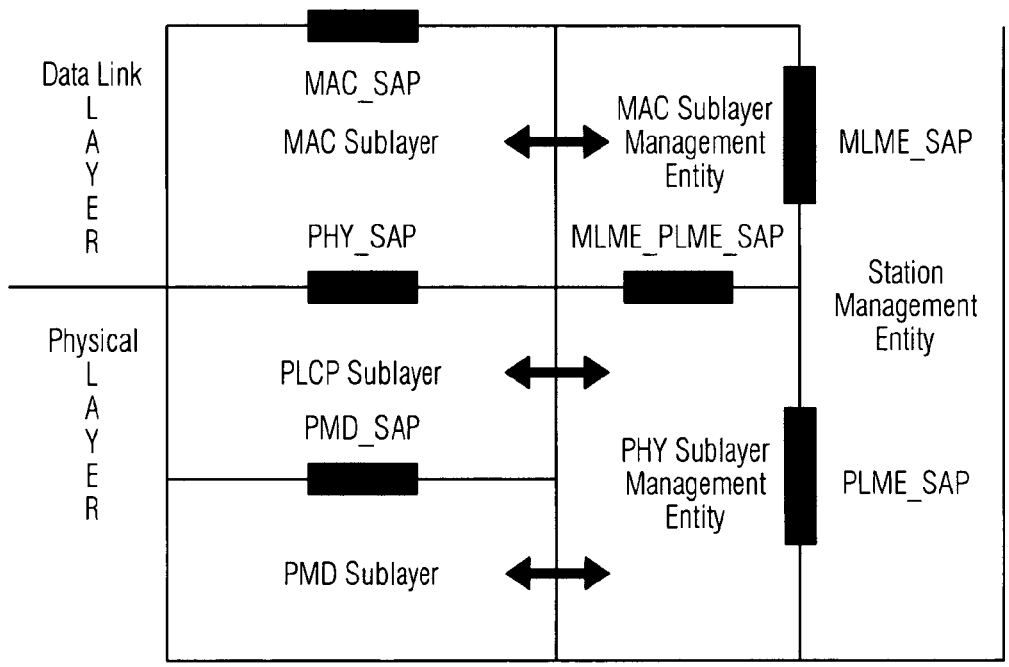
FIG. 7 shows the OSI reference model for layers 1 and 2 of the IEEE 802.11 technology.

FIG. 7 shows the OSI reference model for layers 1 and 2 of IEEE 802.11. The service access point (SAP) that is used for the exchange of primitives between MAC and MUP is referred to as MAC_SAP.

As apparent from the description of the various embodiments of the invention therein, the method and system according to the invention implement a Radio Access Point selection algorithm to select a radio access point as a transmission destination of an acknowledgment message indicating information on a delivery of a data packet at the mobile terminal, based on at least one of a transmission delay on a link connecting at least two radio access points and a network coverage of the mobile terminal provided by at least one of the access points. Since the Radio Access Point selection is performed inside the network, the measurement of a transmission delay can be performed very frequently, without loading the system, either in the wired part or in the air interface.

Moreover, since the Radio Access Point selection algorithm is executed within a network component, the algorithm execution can be performed more quickly than in the case where the algorithm is executed in the station terminal. In addition, another advantage provided by the system and method according to an embodiment of the invention relies in that a conflicting situation where more than one acknowledgment, possibly contradictory, are sent to a network controlling entity comprising the MUP buffer for the same MUP data packet can be avoided. Indeed, since the Radio Access Point that ensures the data transmission to the mobile terminal is aware of the Radio Access Point to which the acknowledgment is transmitted by the mobile terminal, it is prevented from forwarding an acknowledgment to the controlling entity with the MUP buffer if the acknowledgment is supposed to be transmitted to the other Radio Access Point. In addition, the method and system according to an embodiment of the invention allow for improving the spectral efficiency by suggesting a modified channel reservation procedure.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for transmitting data packets in a network, wherein the network comprises at least one mobile terminal and at least a first and a second access point, wherein said first and second access points are connected to each other over a link, the method comprising the following steps:

selecting, by said first access point, either said first access point or said second access point as a destination for a transmission of an acknowledgment message by one of the at least one mobile terminal, wherein the acknowledgement message indicates a delivery of a data packet at the one of the at least one mobile terminal, and wherein the selection is performed by said first access point on the basis of at least one of a transmission delay on the link and a network coverage of the one of the at least one mobile terminal provided by at least one of the first and second access points, notifying, by said first access point, said one of the at least one mobile terminal whether it has selected the first access point or the second access point as the destination for the transmission of the acknowledgment message, transmitting, by said first access point, a data packet to said one of the at least one mobile terminal, transmitting, by said one of the at least one mobile terminal, the acknowledgment message to the first access point, in the event that the first access point has selected as the destination for the transmission of the acknowledgment message, and transmitting, by said one of the at least one mobile terminal, the acknowledgment message to the second access point, in the event that the first access point has selected the second access point as the destination for the transmission of the acknowledgment message, wherein said first and second access points and said one of the at least one mobile terminal implement a Multi-Radio Unification Protocol, the selection of the one of said first and second access points as the transmission destination of the acknowledgment message is performed within the Multi-Radio Unification Protocol at the first access point, and the selection result is notified to the Media Access Control layer along with the data packet to be transmitted.

2. The method according to claim 1, wherein said first and second access points are connected to each other over a wired link.

3. The method according to claim 1, wherein said first and second access points respectively employ a first and second radio access technology different from one another, and said one of the at least one mobile terminal communicates with one of said first and second radio access technology at a predetermined time.

4. The method according to claim 2, wherein said first and second access points respectively employ a first and second radio access technology different from one another, and said one of the at least one mobile terminal communicates with one of said first and second radio access technology at a predetermined time.

5. The method according to claim 1, wherein said first access point is an IEEE 802.11 access point and said second access point is an UMTS/HSDPA access point.

6. The method according to claim 1, wherein said first and second access points and said one of the at least one mobile terminal implement a Multi-Radio Unification Protocol.

7. The method according to claim 1, wherein said first access point transmits to said one of the at least one mobile terminal said selection result of the transmission destination of the acknowledgment message along with the transmitted data packet.

8. The method according to claim 1, further comprising transmitting, by said first access point, the received acknowledgement message to said second access point, when said first access point is selected as the transmission destination of the acknowledgment message.

9. The method according to claim 1, further comprising transmitting, by said first access point, a negative acknowledgement message to said second access point indicating an unsuccessful delivery of said data packet at said mobile terminal, when said first access point is selected as the transmission destination of the acknowledgment message and no acknowledgment message has been received by said first access point.

10. The method according to claim 1, further comprising determining, by said first access point, whether said one of the at least one mobile terminal is in a coverage area of said first access point and/or said second access point.

11. The method according to claim 10, wherein, when said one of the at least one mobile terminal is determined to be in the coverage area of said first and second access points, said method further comprises:
    comparing, by said first access point, a first transmission delay of an acknowledgment message sent to said first access point and then transmitted over the link to the second access point and a second transmission delay of an acknowledgment message sent to said second access point with each other, and
    selecting, by said first access point, one of said first and second access points as the transmission destination of the acknowledgment message based on the comparison result.

12. The method according to claim 10, wherein, when said one of the at least one mobile terminal is determined to be in the coverage area of one of said first and second access points, said first access point selects the one of said first and second access points as the transmission destination of the acknowledgment message.

13. The method according to claim 1, wherein, when said second access point is selected as the transmission destination of the acknowledgment message, said method further comprises:
    reserving, by said first access point, a transmission channel for data transmission from said first access point to said one of the at least one mobile terminal only for a time duration necessary for completing data transmission, thereby suppressing an additional time duration for transmission of an acknowledgment message.

14. The method according to claim 1, wherein the selection result is comprised in a header of a Media Access Control data packet.

15. A system comprising at least one mobile terminal and a network comprising at least a first and a second access point, said first and second access points being connected to each other over a link, wherein said first access point comprises:
    a selecting unit that selects either said first access point or said second access point as a destination for a transmission of an acknowledgment message by one of the at least one mobile terminal, wherein the acknowledgement message indicates a delivery of a data packet at the one of the at least one mobile terminal, and wherein the selection is performed by said first access point on the basis of at least one of a transmission delay on the link and a network coverage of the one of the at least one mobile terminal provided by at least one of the first and second access points,
    a notifying unit that notifies said one of the at least one mobile terminal whether it has selected the first access point or the second access point as the destination for the transmission of the acknowledgment message, and
    a transmitter that transmits a data packet to said one of the at least one mobile terminal,
    and wherein said one of the at least one mobile terminal comprises:
    a transmitter that transmits the acknowledgment message to the first access point, in the event that the first access point has selected the first access point as the destination for the transmission of the acknowledgment message;
    wherein the transmitter transmits the acknowledgment message to the second access point, in the event that the first access point has selected the second access point as the destination for the transmission of the acknowledgment message,
    wherein said first and second access points and said one of the at least one mobile terminal are configured to implement a Multi-Radio Unification Protocol, and said first access point is further configured to select the one of said first and second access points as the transmission destination of the acknowledgment message within the Multi-Radio Unification Protocol and to notify the selection result to the Media Access Control layer along with the data packet to be transmitted.

16. The system according to claim 15, wherein said first and second access points are connected to each other by means of a wired link.

17. The system according to claim 15, wherein said first and second access points respectively employ a first and second radio access technology different from one another, and said one of the at least one mobile terminal is configured to communicate with one of said first and second radio access technology at a predetermined time.

18. The system according to claim 16, wherein said first and second access points respectively employ a first and second radio access technology different from one another, and said one of the at least one mobile terminal is configured to communicate with one of said first and second radio access technology at a predetermined time.

19. The system according to claim 15, wherein said first access point is an IEEE 802.11 access point and said second access point is an UMTS/HSDPA Node B.

20. The system according to claim 15, wherein said first and second access points and said one of the at least one mobile terminal are configured to implement a Multi-Radio Unification Protocol.

21. The system according to claim 15, wherein said first access point is configured to transmit to said one of the at least one mobile terminal said selection result of the transmission destination of the acknowledgment message along with the transmitted data packet.

22. The system according to claim 15, wherein said first access point is configured to transmit the received acknowledgement message to said second access point, when said first access point is selected as the transmission destination of the acknowledgment message.

23. The system according to claim 15, wherein said first access point is configured to transmit a negative acknowledgement message to said second access point indicating an unsuccessful delivery of said data packet at said one of the at least one mobile terminal, when said first access point is selected as the transmission destination of the acknowledgment message and no acknowledgment message has been received by said first access point.

24. The system according to claim 15, wherein said first access point is configured to determine whether said mobile terminal is in a coverage area of said first access point and/or said second access point.

25. The system according to claim 24, wherein:
said first access point further comprises a comparing unit that compares a first transmission delay of an acknowledgment message sent to said first access point and then transmitted over the link to the second access point and a second transmission delay of an acknowledgment message sent to said second access point with each other, when said one of the at least one mobile terminal is determined to be in the coverage area of said first and second access points, and
said first access point is further configured to select one of said first and second access points as the transmission destination of the acknowledgment message based on the comparison result.

26. The system according to claim 24, wherein, when said one of the at least one mobile terminal is determined to be in the coverage area of one of said first and second access points, said first access point is configured to select the one of said first and second access points as the transmission destination of the acknowledgment message.

27. The system according to claim 15, wherein:
said first access point further comprises a reserving unit that reserves a transmission channel for data transmission from said first access point to said one of the at least one mobile terminal only for a time duration necessary for completing data transmission, thereby suppressing an additional time duration for transmission of an acknowledgment message, when said second access point is selected as the transmission destination of the acknowledgment message.

28. The system according to claim 15, wherein said first access point is configured to include the selection result into a header of a Media Access Control data packet.

* * * * *